United States Patent Office 3,681,104
Patented Aug. 1, 1972

3,681,104
MANUFACTURE OF A FLOOR COVERING WITH A PILE
Joachim Schabel, Bremen, and Hans-Peter Liebegott, Achim, Bezirk, Bremen, Germany, assignors to DS-Chemie GmbH & Co. KG., Bremen, Germany
No Drawing. Filed June 2, 1970, Ser. No. 42,862
Int. Cl. D06m 17/00
U.S. Cl. 117—76 T                                            4 Claims

ABSTRACT OF THE DISCLOSURE

A method of manufacturing a floor covering which includes a pile, a pile support material and a foamed thermoplastic backing is characterised in that an anti-foaming agent is applied to the back of the pile support material before a thermoplastic paste is applied thereto.

---

This invention relates to a method for the manufacture of a floor covering with a pile and having a coating on its underside, said coating being applied as a mechanically foamed thermoplastic material to the rear side of the support material for the pile, said thermoplastic material being heated up to a gelling temperature, to make it into a substantially open-pored coating material.

In known methods of carrying out such manufacture a difficulty exists in obtaining a reliable connection between the layer of foam and the fibres of the support material and the fibres of the pile. In order to avoid this difficulty it has already been proposed, after the application of the foamed thermoplastic, to await the beginning of the initial liquefaction and the penetration of the liquified foam between the fibres of the support material and the pile threads, and only then to undertake the solidification or gelling by heating. By this means the said fibres are coated with liquified thermoplastic in the form of a shank and are thus connected in a particularly reliable manner. Also, in this way one can better deal with the relatively unfavourable conditions relating to heating during the gelling of a foam. For this it is important that the heat should be generally transmitted only to the surface of the applied layer of foam, and the more slowly it penetrates the layer of foam, the more intense is the foaming of the thermoplastic, because the individual gas bubbles act as heat insulators. When, as a result of liquefaction, an increase in density occurs in the region nearest to the support material, then in this region the conditions for the transmission of heat by conduction are improved so that a reliable gelling is also possible in the regions furthest away from the surface of the layer of foam.

However, the aforementioned condition is all the more difficult to obtain as the intensity of foaming of the thermoplastic increases and such an increase in intensity of foaming is striven after in the interest of a good floor covering, which should be particularly heat and sound insulating. In order actually to achieve this intended effect at times a foam stabilizer is even added to the thermoplastic. However, in any case the gelling conditions (which are dependent on heat conduction) deteriorate if a thicker layer of foam is used. The latter is appropriate if one wishes to avoid an expensive coating on the support material, which is frequently a basic fabric, and in place of this the irregularies in the support material are compensated for by the foam material. The surface of the finished gelled layer of foam is thus mainly smooth and thus leads without any embossing or smoothing treatment to an immediately usable floor covering.

The object of the invention is to provide an improved method of manufacture of a floor covering with a pile so that on the one hand, an excellent adhesion is created between the thermoplastic and the fibres of the support material by a shank-like coating, but that, on the other hand, for this, it is not necessary to wait for the natural liquefaction of the foam, as has already been proposed.

In accordance with the invention there is provided a method of manufacturing a floor covering including a pile and a support material therefor and having a coating on its underside, said coating being applied as a mechanically foamed thermoplastic to the rear side of the pile support material and being made into a substantially open-pored coating material by heating up to a gelling temperature, characterised in that an anti-foaming agent in the form of a liquid dispersion of a solid substance is firstly applied to the support material whereafter a paste of mechanically foamed thermoplastic material is applied subsequently in known manner and is liquified in its boundary region near to the support material by said anti-foaming agent.

In carrying the invention into effect, there is provided a support material (which may be in the form of a coarse fabric) to which a pile is secured in any convenient and known manner. To the back of said support material there is then applied an anti-foaming agent before a foamed thermoplastic paste is subsequently applied on top of the anti-foaming agent. There is thus formed a floor-covering material which is heated to effect gelling of said paste and thereby provide a foamed thermoplastic backing to the floor covering.

The anti-foaming agent is chosen to suit the specific thermoplastic used, said agent being present especially in the region nearest the floor covering or its support material. Thus the anti-foaming agent is not applied in great quantities, to the support material.

The presence of the anti-foaming agent on the support material leads, after the application of the foamed thermoplastic paste, to the decomposition of the foam in the said boundary zone. The gas released from the original foam pores during this process can escape to a considerable degree through the floor covering material which is generally permeable to air, so that no larger bubbles are formed inside the layer, which would otherwise impair the uniformity of the pore structure and thus also the efficiency of the layer of foam.

Due to the partial liquefaction in the boundary zone there occurs a considerable increase in density of the thermoplastic. This has the result that the heat conduction is improved and the heat acting on the layer of thermoplastic from the outside when heating is applied can penetrate better into the region in which a connection is made between the thermoplastic paste and the floor covering. The paste can be easily initially foamed before it is applied; can be strengthened with suitable fillers for reasons of quality and economy, and also from other points of view can be shaped as required.

The anti-foaming agent should have no effect on the quality of the foam. For this reason it is advantageous when choosing the agent to take into account not only its foam-destroying effect in relation to the thermoplastic paste used, but also to consider that after the completion of the gelling the anti-foaming agent should not be present in the fibres of the pile.

By using an anti-foaming agent in the form of a solid in a liquid dispersion (for example an aqueous dispersion) one can achieve a uniform distribution of the anti-foaming agent over the boundary region of the support material by spraying. The dispersion fluid is then soaked up by the capillary structure of the floor covering material whereas solid anti-foaming agent itself is retained on the boundary region and carries out its intended effect there. Suitable solid anti-foaming agents are stearates, such as for exampled pentaerythritol monostearate or an aluminium stearate. Instead of using water the dispersion can also be undertaken in a particularly effective manner in a liquid anti-foaming agent. Suitable dispersions can also be made in a very volatile alcohol, such as methanol or ethanol.

Finally, the intended effect can be increased in that the anti-foaming agent can be mixed with a plastisol, in which it can be soluble or even unsoluble and then sprayed in the said manner.

If necessary after the gelling process, the coating can be smoothed or even shaped on its surface by rollers with a cooled roller.

The anti-foaming agent can conveniently be applied by the so-called "slopping" process. By this one understands the transfer of the liquid containing the anti-foaming agent to the support material by means of a rotating roller which is partially submerged in the liquid containing the anti-foaming agent and by means of which the support material is moved along. The rotating roller rolls on the support material and thus constantly wets the latter.

Having thus described our invention, what we claim as new and desire to secure by Letters Patent is:

1. A method of manufacturing a floor covering including a pile and a support material therefor and having a coating on its underside, said coating being applied as a mechanically foamed thermoplastic to the rear side of the pile support material and being made into a substantially open-pored coating material by heating up to a gelling temperature, characterised in that an anti-foaming agent in the form of a liquid dispersion of a solid substance is firstly applied to the support material whereafter a paste of mechanically foamed thermoplastic material is applied subsequently in known manner and is liquified in its boundary region near to the support material by said anti-foaming agent.

2. A method according to claim 1 characterised in that stearates are incorporated in said liquid dispersion.

3. A method according to claim 1 characterised in that said anti-foaming agent is mixed with a plastisol, the mixture then being sprayed onto the support material.

4. A method according to claim 1 characterised in that said liquid dispersion of a solid substance is made in a volatile alcohol.

References Cited

UNITED STATES PATENTS

| 3,161,556 | 12/1964 | Slosberg | 117—8 |
|---|---|---|---|
| 3,206,343 | 9/1965 | McFarlane | 156—78 |
| 3,257,483 | 6/1966 | Eberle | 264—45 |
| 3,293,108 | 12/1966 | Nairn et al. | 156—78 |
| 3,410,932 | 11/1968 | Woodson et al. | 264—45 |

ROBERT F. BURNETT, Primary Examiner

L. KOECKERT, Assistant Examiner

U.S. Cl. X.R.

161—67, 159